United States Patent Office 3,448,092
Patented June 3, 1969

3,448,092
POLYMERIZATION PROCESS AND PRODUCT
Robert Chiang, Durham, N.C., assignor to Monsanto Company, St. Louis, Mo., a corporation of Delaware
No Drawing. Continuation-in-part of applications Ser. No. 355,937, Mar. 30, 1964, and Ser. No. 152,021, Nov. 13, 1961. This application Nov. 17, 1966, Ser. No. 595,042
Int. Cl. C08f 1/28, 1/08, 1/78
U.S. Cl. 260—79.3          10 Claims

ABSTRACT OF THE DISCLOSURE

This application discloses the formation of novel polymers of acrylonitrile and small amounts of comonomers which have a reduced tendency to yellow upon heating because the polymers possess less than $5\mu$ eq./gm. of chromophoric weak acid groups identifiable by titration with a base when hydrolyzed in the presence of a mineral acid. The novel polymers are formed by non-aqueous solution polymerization in the presence of a polymerization initiator having the formula $$M[M'''R_{4-i}(OR')_i]_m$$

wherein M is an alkali metal or an alkaline earth metal, M''' is a Group III-A metal, aluminum being preferred, R and R' are the same or different monovalent hydrocarbon radicals having up to about 12 carbon atoms, $i$ is an integer from 1 to 4 and $m$ is an integer of 1 to 2 which corresponds to the valence of M. The polymers can be spun from the polymerization solution to provide white textile fibers.

---

This application is a continuation-in-part of Ser. No. 355,937, filed Mar. 30, 1964, now abandoned and Ser. No. 152,021, filed Nov. 13, 1961, and now abandoned.

This invention relates to a novel method for polymerizing acrylonitrile and to novel polymers.

More particularly, the invention relates to the polymerization of acrylonitrile along and with minor amounts of ethylenically unsaturated monomers copolymerizable therewith in non-aqueous solutions wherein the reaction is initiated with an organometallic coordination complex. The polymers thus prepared exhibit gross reduction in color forming chromophoric weak acid groups.

There are several catalyst systems in use for the initiation of the polymerization of acrylonitrile. One widely employed system involves the use of ionic type catalysts wherein polymerization is initiated in the presence of a base of metal alkoxide type, sodium ethoxide being a typical example. The type of catalyst, however, initiates polymerization at such a rapid rate that the course of the reaction is difficult to control even at room temperature. Polymerization proceeds so rapidly at ambient temperatures that is is difficult, if not impossible, to obtain polymers with molecular weights sufficiently high for fiber forming purposes. Moreover, the polymer products prepared using metal alkoxides suffer the further disadvantage of having poor color properties. Lowering the reaction temperatures to the sub-zero range slows the reaction and results in a polymer of increased molecular weight and improved color. However, the need to operate at very low temperatures is not consistent with the requirements of commercial practice.

The principal object of this invention resides in an improved process for the polymerization of acrylonitrile.

A further object of this invention is to provide a process for the polymerization of acrylonitrile wherein product molecular weights and color can be controlled to provide novel acrylonitrile polymers suitable for the formation of textile fibers.

These and other objects of this invention will become apparent in the ensuing description of the invention.

The objects of this invention are accomplished by conducting the polymerization of acrylonitrile in a nonaqueous liquid medium in the presence of an organometallic coordination complex.

The complex catalysts or initiators employed in the process of this invention may be represented by the following formula $$M[M'''R_{4-i}(OR')_i]_m$$

wherein M is an alkali metal or an alkaline earth metal, M''' is a Group III-A metal, aluminum being preferred, R and R' are the same or different monovalent hydrocarbon radicals having up to about 12 carbon atoms, $i$ is an integer of from 1 to 4 and $m$ is an integer of 1 to 2 which corresponds to the valence of M.

The initiator of this invention where $i$ is 1 may be prepared by the reaction of an alcohol or phenol having the formula R'OH with an organo aluminum complex having the formula $M[AlR_4]_m$ in a molar ratio of about $m:1$.

This procedure may be modified by the substitution of less than a stoichiometric amount of molecular oxygen for the alcohol. When oxygen is employed molar ratios of less than about 0.5 mmole of $O_2$ per mole of the complex $M[AlR_4]_m$ are preferred.

Another method useful in the preparation of the initiators of this invention wherein $i$ is 1 comprises the reaction of an alkali metal or an alkaline earth metal derivative of an alcohol or phenol having the formula $M(OR')_m$ with $AlR_3$ in a molar ratio of about $1:m$.

If an initiator where $i$ is greater than 1 is desired an excess of the alcohol or phenol employed in the method first described may be employed or the product $$M[AlR_3(OR')]_m$$

of any of the procedures described may be further reacted wit hfrom about 1 mmole to about 3 mmole of alcohol or phenol having the formula R'OH.

In all of the above described methods for the preparation of the initiators care should be taken to exclude contact of the reactants with oxygen (except where oxygen is used as a reactant) and moisture to preclude contamination of the catalysts and to avoid undesirable side reactions. Usually the reactions are conducted in an inert liquid medium under an atmosphere of nitrogen, argon or other inert gas. The inert liquid medium must dissolve, partially or completely one or both of the reactants to provide adequate contact of the reactants. Suitable liquids for conducting the above described reactants are the liquid paraffinic and aromatic hydrocarbons such as butane, hexane, heptane, isooctane, benzene and toluene and mixtures of liquids of this type.

The reactions normally occur spontaneously at ambient temperatures where one or more of the reactants is well dissolved in the liquid medium. Where the reactants are only slightly soluble in the inert liquid medium it may be desirable to raise the temperature to increase the rate of the reaction. Normally atmospheric pressures are used. However, pressures may be raised or lowered to accommodate procedural techiques. The conditions of temperatures, pressures and time of reaction have not been found to be critical in the preparation of the catalysts. Upon completion of the reaction the product may at least partially precipitate from the liquid medium in which case it may be separated by filtration, care being taken to preclude exposure to air or moisture. In case where the catalyst product is partially or wholly dissolved in the liquid medium it may be isolated by removing the solvent or by low temperature crystallization. Because the catalyst products are oxygen and moisture sensitive they are preferably not isolated prior to use in the polymerization process of this invention. Accordingly, in cases where the catalysts precipitate from the reaction medium, dimethyl sulfoxide, dimethylformamide or other polymerization solvent is desirably added to the reaction medium to dissolve the catalyst for use in a later polymerization process.

The several reactants employed in the preparation of the organo-aluminum coordinate complexes of this invention are generally known in the art and they are readily available for the preparation of the catalysts of this invention.

Thus, the compounds represented by the formula $AlR_3$ are known in the art. The R radicals may be the same or different aryl, alicyclic or aliphatic radicals having up to about 12 carbon atoms. Suitable aryl radicals are phenyl, tolyl, xylyl and naphthyl, for example. Among the alicyclic radicals which may be useful substituents illustrative members are cyclopentyl, methylcyclopentyl, cyclohexyl and cycloheptyl. The aliphatic radicals comprise the straight and branch chain hydrocarbons such as dodecyl, isooctyl and preferably the lower aliphatic radicals such as ethyl, isopropyl, butyl and hexyl.

The reactants having the formula $AlR_3$ may be employed as precursors for the complex reactants represented by the formula $M[AlR_4]_m$, the latter being conveniently prepared by reacting $AlR_3$ in a dispersion of an alkali metal or an alkaline earth metal.

The reactants $R'OH$ and $M(OR')_m$ are generally known in the art and comprise compounds such as cresol, cyclohexanol, sodium phenolate, sodium isopropoxide, magnesium t-butoxide, lithium amyloxide, ethanol and the like. The $R'$ radicals comprise hydrocarbons having up to about 12 carbon atoms and may be aryl, alicyclic or aliphatic. The $R'$ radicals conform in scope to those above described for R.

When the initiators are prepared using oxygen, air, or oxygen enriched air may be employed. The use of pure oxygen should be avoided or very carefully controlled to preclude the possibility of explosion.

The polymerization of acrylonitrile along or in the presence of other ethylenically unsaturated monomers copolymerized therewith according to this invention is conducted by contacting acrylonitrile and up to about 25% of one or more such comonomers dissolved in a nonaqueous solvent with a catalytic amount of the organoaluminum coordinate complex initiators above described. Care should be taken to preclude contamination of the reaction mixture with oxygen or moisture at least until the desired degree of polymerization is completed. Usually the reaction system is kept under nitrogen or other inert gas.

Any of the well known nonaqueous polymerization solvents which are inert to the reactants may be employed in the practice of this invention. However, the polar solvents such as dimethylformamide (DMF), dimethylacetamide (DMA), dimethylsulfoxide (DMSO) and mixtures of these solvents with other solvents such as toluene are preferred.

The condition of temperature, pressure, time, catalyst concentration and monomer to solvent ratio may be varied appreciably and have not been found to constitute critical aspects of this invention. Thus, temperature from about −30° to about 75° C. preferably between about −10° C. and 25° C. have been found to be operative for polymerization using the novel initiator system herein described. It has been observed, however, that the polymer color is improved when the polymerization is initiated at temperatures below about 25° C., about 0° C. being highly preferred. Atmospheric pressures are normally used. Pressures above or below atmospheric may be employed, if desired, to accommodate procedural techniques. Catalyst concentrations as low as about 0.01 to about 5 percent by weight of the monomer initiate the polymerization. However, use of the catalyst in the higher concentrations is unnecessary to provide the catalytic function and usually result in detectable amounts of initiator fragments in the polymer. The particular concentration of the catalyst may be determined by the desired degree of conversion and the molecular weights desired. The time necessary for polymerization will of course depend on other conditions such as catalyst concentration, the particular solvent system used and the temperature. Reactions have been conducted for periods of time ranging from less than an hour up to several days. The time for terminating the reaction will be obvious to one skilled in the art. Termination may be accomplished by the use of conventional shortstopping agents such as methanol, water, HCl and the like. The solvent to monomer ratio is not critical and may depend to a large degree on the disposition of the final product. Thus, the polymer may be isolated upon completion of the reaction or the solvent may be increased or decreased to provide a polymer concentration suitable for spinning.

As above indicated polymerization employing initiators according to this invention may be conducted to prepare homopolymers of acrylonitrile as well as interpolymers of acrylonitrile and up to about 25 weight percent of one or more monoethylenically unsaturated monomers interpolymerizable therewith. Exemplary of compounds interpolymerizable with acrylonitrile according to the novel process of the invention are compounds such as methyl acrylate, ethyl acrylate, methacrylonitrile, vinyl phenyl sulfone, sulfophenyl vinyl sulfone and alkali metal salts thereof, such as sodium vinylsulfone phenylsulfonate. In practice the interpolymerizable monomer may be fed to the reaction zone with the acrylonitrile monomer or as a separate feed. The monomers and initiator may be fed continuously or, if desired the polymerization may be conducted as a batch operation by techniques well known in the art.

The polymers prepared by this invention may be spun by conventional processes to provide useful textile fibers. One such spinning process is described by Knudsen in U.S. Patent No. 3,088,188.

In order to illustrate the invention in greater detail, the following specific examples are given, it being understood that they are intended to be illustrative and not limitative.

EXAMPLE I

This example illustrates the polymerization method of this invention wherein an organometallic coordination complex obtained by reacting sodium isopropyl oxide with aluminum triethyl and represented by the formula

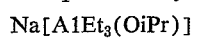

Na[AlEt₃(OiPr)]

was employed as an initiator.

The sodium isopropyl oxide component of the catalyst was prepared by reacting elemental sodium with anhydrous isopropyl alcohol in the absence of air. The temperature was raised sufficiently to cause evaporation of the alcohol and the reaction mixture was occasionally flushed with nitrogen to remove the excess alcohol.

To 6.2 millimoles of the above prepared sodium isopropyl oxide, there was added 5 cc. of a 25 percent n-heptane solution of aluminum triethyl (1.68 millimoles per cc. of solution based on Al). The mixture was tumbled for approximately one hour to assure complete reaction.

To a portion of the catalyst slurry obtained, as above described, there was added with mixing 20 cc. of acrylonitrile dissolved in 60 cc. of dimethylformamide. Polymerization began and was allowed to proceed at 25° C. for about 16 hours, after which the reaction was stopped by adding 10 cc. of aqueous HCl solution. The polymer was recovered by precipitation in methanol and was then washed in dilute hydrochloric acid and water to remove the inorganic reside. The polymer approximated whiteness with the conversion being about 55 percent.

EXAMPLE II

A catalyst represented by the formula $Na[AlEt_3(OiPr)]$ was prepared by reacting under nitrogen 0.2 gm. of anhydrous sodium isopropyl oxide (0.0024 mole) with 1.8 cc. of a 25 percent heptane solution of aluminum triethyl (0.003 mole). Into this mixture 30 cc. of dry dimethylformamide was introduced as a solvent, followed by 10 ml. (8.0 gms.) of acrylonitrile. Polymerization was carried out at ambient temperatures for a period of about 16 hours. From the reaction mixture there was recovered 6.9 gms. of polymer, corresponding to a conversion of 86 percent. The polymer approximated whiteness in color and had a molecular weight of about 400,000.

EXAMPLE III

A solution of 1.75 ml./(30 millimoles) of ethyl alcohol in toluene to give a total volume of 10 ml. was prepared. A 1 ml. aliquot, containing 3 m. moles of ethanol was added to 9 ml. of a toluene solution containing 0.5 gm. (3 millimoles) of $Na[AlEt_4]$. The reaction mixture was warmed to about 90° C. in a nitrogen atmosphere to effect the reaction.

Two toluene solutions of $Na[AlEt_3(OEt)]$ each containing 0.03 millimole of the initiator were added separately to solutions of 75 millimoles of acrylonitrile dissolved in 50 ml. of DMF at −10° C. and 0° C. Polymerization in each case was allowed to proceed for 20 hours. Conversions to polyacrylonitrile based on the monomer were found to be 80 percent at −10° C. and 88 percent at 0° C.

EXAMPLE IV

The polymerization of Example III was repeated using the initiator prepared by the reaction of $Na[AlEt_4]$ with $O_2$ (dry air). After 20 hours conversion of monomer to polyacrylonitrile was 75%.

EXAMPLE V

Twenty-five cc. of dimethylsulfoxide (DMSO), 5 grams of acrylonitrile and 0.15 gram of vinyl phenyl sulfone were placed in a pressure tube (equipped with a rubber liner) under nitrogen while maintaining the temperature therein at about 6° C. One cc. of $Na[AlEt_3(OiPr)]$ was introduced through the rubber liner with a hypodermic needle. The reaction proceeded rapidly as evidenced by observation of increased viscosity of the reaction to produce a polymer which had a pure white appearance. The conversion was determined to be 92 percent. The polymer molecular weight (calculated from the Cleland-Stockmayer equation) was 170,000.

EXAMPLE VI

Five hundred grams (530 cc.) of distilled, dry DMF, 110 grams (5.07 moles) of acrylonitrile and 3.4 grams (0.050 mole) of vinyl phenyl sulfone were placed in a 1 liter, three-necked reaction flask fitted with a stirrer and a nitrogen breather, the temperature of the reaction flask being maintained at 0° C. in ice. An aliquot of 10 cc. (5.5 millimoles) of the initiator, $Na[AlEt_3(OiPr)]$, was introduced into the monomer solution with adequate stirring. The reaction proceeded more slowly than in Example V. Within a period of half an hour to an hour the reaction mixture became quite viscous while remaining a clear solution. Toward the end of the reaction period, the solution became very slightly yellow. The reaction was terminated while still under nitrogen by adding 10 cc. of DMF containing 0.5 gram of oxalic acid as a shortstopping agent at which time the slight yellow color previously observed disappeared. The reaction mass was thereafter heated to 80° C. for more than half an hour without color formation. The clear, viscous reaction mixture or polymer dope was extruded to form fine white fibers.

The results of interpolymerization of acrylonitrile with vinyl phenyl sulfone at different concentrations and with other copolymerizable monomers are summarized in Table I.

TABLE I

| Example | AN grams | Comonomer,[1] percent | Solvent, cc. | Catalyst, millimoles | Temp., °C. | Reaction time (hrs.) | Conversion, percent | Mol. wt. ×10 |
|---|---|---|---|---|---|---|---|---|
| VII | 5 | | 25 DMF | 0.1 | 0 | 5 | 96–98 | |
| VIII | 110 | 3.4 VPS | 500 DMF | 2.2 | 0 | 1.25 | 95 | 60 |
| IX | 4.92 | 3.5 VPS | 25 DMF | 0.1 | 0 | 4 | 97 | 145 |
| X | 5 | 4.5 EA | 25 DMF | 0.1 | 0 | 5 | 87 | 170 |
| XI | 5 | 15 EA | 25 DMF | 0.1 | 0 | 6 | 69 | |
| XII | 5 | 4.3 MA | 25 DMF | 0.1 | 0 | 4.5 | 51 | 180 |
| XIII | 5 | | 25 DMSO | 0.1 | 6 | 0.83 | 87 | 430 |
| XIV | 5 | 3 VPS | 35 DMSO | 0.1 | 6 | 1 | 92 | 170 |
| XV | 5 | 4.59 MA | 35 DMSO | 0.1 | 6 | 4 | 47 | 195 |

[1] Based on acrylonitrile charged.
VPS—Vinyl phenyl sulfone; EA—Ethyl acrylate; MA—Methyl acrylate.

Acrylonitrile polymers prepared through free radical initiated polymerization techniques uniformly discolor upon being subjected to elevated temperatures for extended periods of time. Chromophoric groups which cause a gradual yellow to brown coloration upon heating the polymer are believed to be initiated by the chain building free radical of the polymer itself. Thus, in Reaction Scheme I below it is postulated that a polymer free radical (2) attacks a cyano group along the chain of a different molecule (1) to form a branch chain having a transitory imino free radical (3).

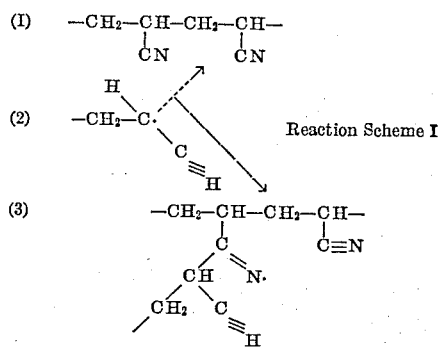

Reaction Scheme I

The branched polymer having the transitory free radical (3) may react further with additional monomeric acrylonitrile units to form imino radical containing polymers (4). These are readily hydrolyzed to form a polymer containing β-keto nitrile radicals (5) and their tautomers (6) as indicated in Reaction Scheme II.

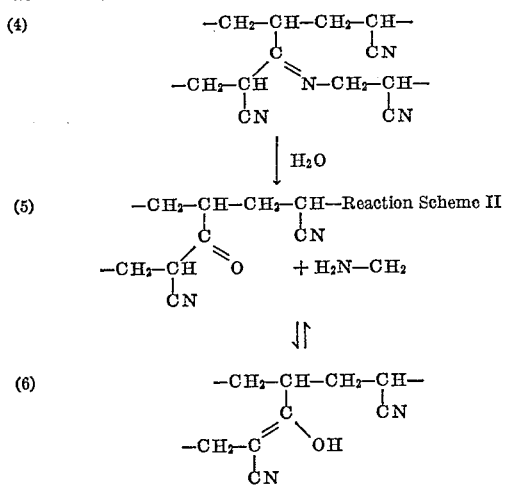

The polymer containing the β-keto nitrile (5) and its tautomer (6) form known chromophoric groups in the polymer chain indicated by (7) upon heating.

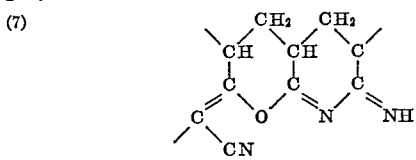

The polymers believed to contain β-keto nitrile radicals (5) are titratable with base and are herein designated as polymers possessing chromophoric weak acid groups (CWAG). It has been shown that there is a correlation between the concentration of CWAG as in the polymer (measured by titration as microequivalents of CWAG per gram of polymer, μ eq./g.) and the degree of coloration of the acrylonitrile polymer when subjected to elevated temperatures over extended periods of time. Coloration of the polymer is measured by a yellowness index as hereinafter described. Quite unexpectedly, acrylonitrile polymers prepared using the coordinate complex catalysts of the instant invention are quite stable to heat over extended periods of time as evidenced by a low yellowness index. Known polymers prepared through the use of free radical initiators, however, possess a distinctly higher yellowness index. In keeping with this discovery the polymer prepared using the coordinate complex catalyst according to the instant invention exhibits concentrations of CWAG, determined by titration, of less than about 5 μ eq./g., whereas, polymers prepared through free radical mechanisms exhibit considerably higher CWAG concentrations.

Thus, the invention contemplates acrylonitrile polymers which possess enhanced stability to heat having less than about 5 μ eq./g. of CWAG identifiable by subjecting the polymer to hydrolysis with a mineral acid and thereafter titrating the polymer with a base.

The following examples describe in detail the manner for determination of CWAG concentration and yellowness index by which the novel polymers of the instant invention can be identified and distinguished from the prior art.

EXAMPLE XVI (1) A homopolymer of acrylonitrile was prepared by conventional means using $K_2S_2O_8/SO_2$ redox initiator system at 50° C. The polymer had a specific viscosity of 0.137 (measured at 25° C. in 0.1 percent DMF solution).

(2) Another batch of polyacrylonitrile prepared by a similar free radical technique had a specific viscosity of 0.208.

(3) An interpolymer of acrylonitrile and methyl acrylate was prepared by dissolving 28.5 grams of acrylonitrile and 15 grams of methyl acrylate in 1000 grams of DMSO and adding with stirring to the solution at 15° C. 4.0 millimoles of $Na[AlEt_3(OiPr)]$ dissolved in toluene from a hypodermic syringe. The reaction was continued for 4 hours after which polymerization was shortstopped with oxalic acid. The polymer was precipitated from the reaction mixture in methanol and thereafter collected, washed with water and dried. The polymer had a specific viscosity of 0.295. Infrared determination showed the polymer contained 98.9 weight percent acrylonitrile and 1.1 percent methyl acrylate.

The yellowness index of the above prepared was determined by heating ground polymer in a 145° C. forced air oven for 8 hours, and then pressing the polymer in disks two inches in diameter. Reflectance measurements on each of the disks were made in a G.E. Recording Spectrophotometer. The equation used in determination of the yellowness index is:

$$\text{Yellowness Index} = \frac{1.28X - 1.06Z}{Y} \times 100$$

where X, Y, and Z are the tristimulus values obtained.

The concentration of chromophoric weak acid groups in the above-prepared polymers was determined as follows:

A mixed solvent containing 75 parts ethylene carbonate and 25 parts propylene carbonate (EC/PC) was stirred overnight with activated carbon and passed over an ion exchange resin (Amberlite MB–3). The mixed solvent was then slightly acidified (250 μ eq./l.) with $HClO_4$.

Sixty milligrams of the polymer samples were separately dissolved in 15 cc. of the thus purified EC/PC and the absorbance of the polymer solutions were measured vs. solvent in a 1 centimeter cell at 275 mμ on a Cary Model 11 Recording Spectrophotometer. An excess of base (0.2 ml. of 0.1 N tetramethylammomium hydroxide in EC/PC) was then added to the polymer solutions and the absorbance measured as above on the Spectrophotometer. CWAG contents were then calculated using the formula:

$$25\Delta A = \mu \text{ eq. CWAG/gm. polymer}$$

The relationships of CWAG to increase in absorbance (ΔA) on addition of the base were quantified by titration measurements in a series of samples.

The correlation of CWAG concentration to Yellowness index is shown in Table II for the polymers above prepared.

TABLE II

| Polymer | Yellowness index | CWAG Concentration, eq./gm. |
|---|---|---|
| Example XVI (1) | 26.7 | 32.4 |
| Example XVI (2) | 24.3 | 23.0 |
| Example XVI (3) | 14.3 | 4.3 |

The low level of chromophoric weak acid groups in the polymers of the instant invention is believed due to an insertion mechanism through which the monomer units are linearly added to the growing polymer chain. In contrast, the free radical initiated polymerization serves to form free radicals which attack polymer as well as monomer units as illustrated in Reaction Scheme I above. Attacks by free radical groups along a polymer chain cause chain branching and lead to chromophoric group formation. While the exact nature of the color formation postulated above has not been proved in the polymer, experiments employing model compounds indicate that the postulated mechanisms are correct. In any case these mechanisms are corroborated by CWAG titration and the Yellowness index such that the novel polymer of the instant invention can be distinguished from the prior art through the determination of CWAG concentration.

I claim:

1. In a process for the polymerization of acrylonitrile and up to 25 percent by weight of ethylenically unsaturated monomers copolymerizable therewith in a nonaqueous solution, the step which comprises conducting the polymerization in the presence of catalytic amounts of an organoaluminum coordinate complex initiator represented by the formula $$M[M'''R_{4-i}(OR')_i]_m$$

wherein M is a metal selected from the group consisting of an alkali metal and an alkaline earth metal, M''' is a Group IIIA metal, R and R' are hydrocarbon radicals having up to about 12 carbon atoms, $i$ is an integer of from 1 to 4 and $m$ is an integer of from 1 to 2 which corresponds to the valence of M.

2. The process of claim 1 wherein $i$ is 1 and M''' is aluminum.

3. The process of claim 2 wherein M is an alkali metal.

4. The process of claim 3 wherein R and R' are lower alkyl radicals.

5. The method of forming acrylic polymers which comprises contacting in an inert atmosphere at a temperature between about $-10°$ C. and $25°$ C. a solution of acrylonitrile and up to 25 percent by weight of ethylenically unsaturated monomers copolymerizable therewith dissolved in a solvent selected from the group consisting of dimethylsulfoxide, dimethylacetamide and dimethylformamide with a catalytic amount of a coordinate complex initiator represented by the formula $$Na[AlR_3OR']$$

wherein R and R' are lower alkyl radicals.

6. The method of claim 5 wherein the solvent is dimethylsulfoxide.

7. The method of claim 6 wherein R and R' are ethyl radicals.

8. The method of claim 6 wherein R and R' are isopropyl radicals.

9. The process of claim 6 wherein comonomers copolymerizable therewith are selected from the group consisting of methyl acrylate, ethyl acrylate, methacrylonitrile, vinyl phenyl sulfone and sodium vinylsulfone phenylsulfonate.

10. The method of forming fibers of acrylonitrile polymers containing at least about 75 weight percent of acrylonitrile and up to 25 weight percent of ethylenically unsaturated monomers copolymerizable therewith which comprises contacting a non-aqueous solution of acrylonitrile and up to about 25 weight percent of said copolymerizable monomers with a catalytic amount of a polymerization initiator having the formula $$M[M'''R_{4-i}(OR')_i]_m$$

wherein M is a metal selected from the group consisting of an alkali metal and an alkaline earth metal, M''' is aluminum, R and R' are hydrocarbon radicals having up to about 12 carbon atoms, $i$ is an integer of from 1 to 4 and $m$ is an integer of from 1 to 2 which corresponds to the valence of M, allowing the polymerization to proceed at temperatures between about $-10°$ C. and $25°$ C. to form a solution of fiber-forming acrylonitrile polymers, shortstopping the polymerization and thereafter extruding said fiber-forming acrylonitrile polymer maintained in solution to form filaments.

References Cited

UNITED STATES PATENTS

| | | | |
|---|---|---|---|
| 3,097,415 | 7/1963 | Davis | 260—88.7 |
| 3,098,060 | 5/1960 | Miller | 260—88.7 |
| 3,148,944 | 9/1964 | Van Dijk et al. | 260—88.7 |
| 3,240,772 | 6/1960 | Natta et al. | 260—88.7 |

HARRY WONG, JR., *Primary Examiner.*

U.S. Cl. X.R.

260—30.8, 32.6, 85.5